Jan. 26, 1926.  
E. J. PATELSKI  
1,570,920  
POWER ATTACHMENT FOR KITCHEN UTENSILS AND THE LIKE  
Filed Dec. 17, 1923  3 Sheets-Sheet 1

Witness:  
Chas. R. Koursh.

Inventor,  
Erich J. Patelski,  
By Offield, Bulkley, Towle & Scott Attys.

Jan. 26, 1926.  1,570,920
E. J. PATELSKI
POWER ATTACHMENT FOR KITCHEN UTENSILS AND THE LIKE
Filed Dec. 17, 1923  3 Sheets-Sheet 2
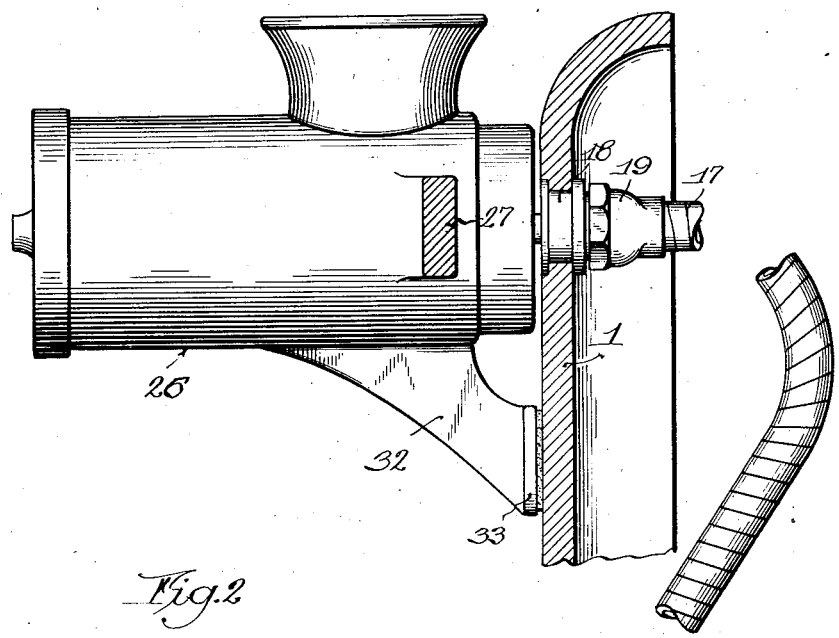
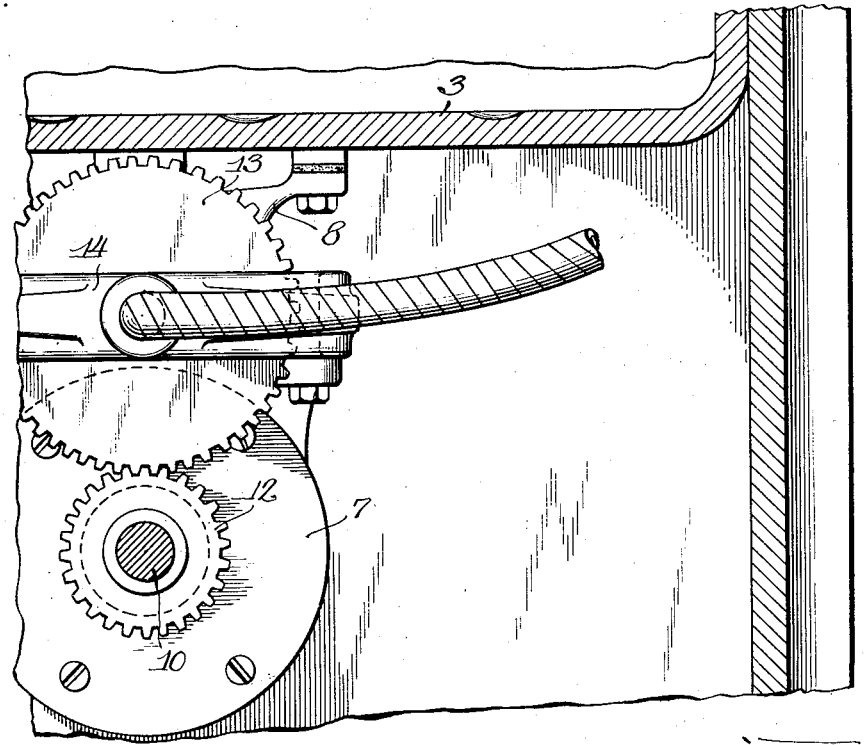
Witness:
Chas. R. Hursh
Inventor,
Erich J. Patelski,
By Offield, Bulkley, Poole & Scott Attys.

Jan. 26, 1926.  1,570,920
E. J. PATELSKI
POWER ATTACHMENT FOR KITCHEN UTENSILS AND THE LIKE
Filed Dec. 17, 1923   3 Sheets-Sheet 3
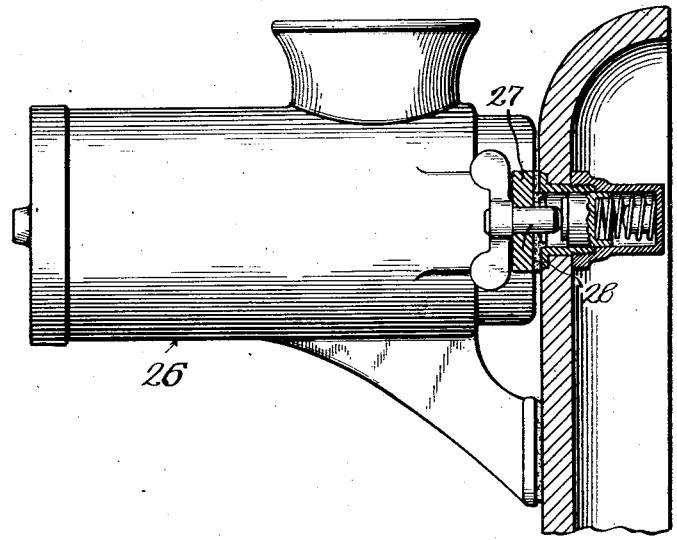
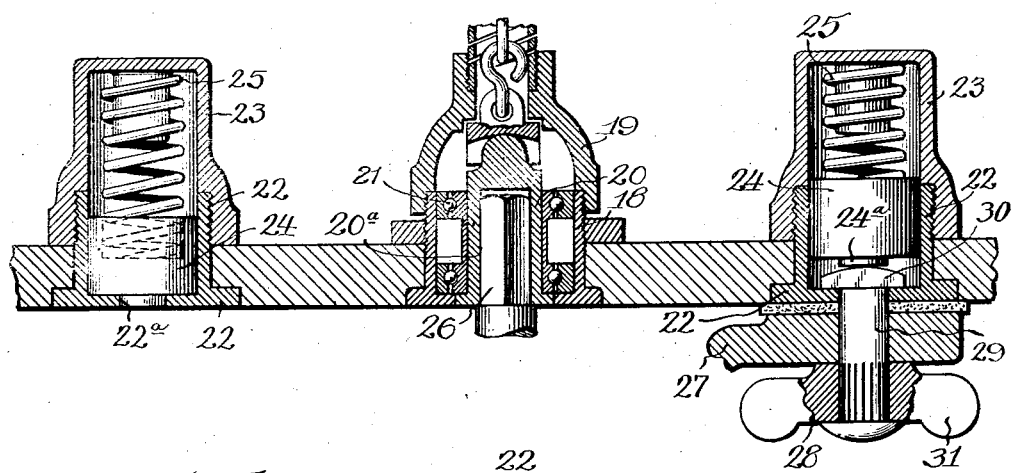
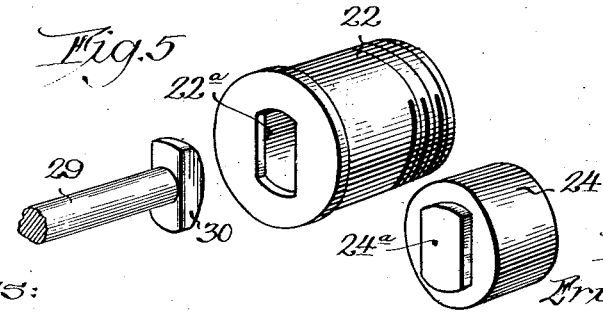

Patented Jan. 26, 1926.

1,570,920

UNITED STATES PATENT OFFICE.

ERICH J. PATELSKI, OF CHICAGO, ILLINOIS.

POWER ATTACHMENT FOR KITCHEN UTENSILS AND THE LIKE.

Application filed December 17, 1923. Serial No. 681,182.

*To all whom it may concern:*

Be it known that I, ERICH J. PATELSKI, a citizen of the United States, and a resident of Chicago, in the county of Cook and State of Illinois, have invented certain new and useful Improvements in Power Attachments for Kitchen Utensils and the like, of which the following is a specification.

This invention relates to improvements in power and supporting attachments for power-driven kitchen utensils such as are commonly used in the preparation of food.

The object of the invention is to provide a useful and convenient source of motive power which may be readily available for driving a variety of rotary kitchen utensils such as meat grinders, coffee mills, ice cream freezers, beaters, mixers, and the like.

A further object of the invention is to provide a new and useful mounting for the various utensils whereby the same can be interchangeably connected with the source of power and firmly supported while in operation.

In the accompanying disclosure the source of power is a flexible shaft driven from a motor, the latter being mounted upon a sink fixture and furnishing the power for a mechanical dish washing apparatus incorpo30 rated in the sink. While the utilization of a single source of power for operating both the dish washing apparatus as well as the various utensils used about a kitchen, it is manifest that such a combination is the re35 sult of an effort to provide a complete and economical kitchen fixture, but does not preclude the use of a separate source of motive power and other supporting means than a sink. The preferred embodiment of the in40 vention has been illustrated in the accompanying drawings wherein:

Figure 1 is a general view in longitudinal vertical section through one portion of a sink and showing the flexible shaft drive.

Figure 2 is a view in transverse vertical section, showing a utensil attached and in operative position.

Figure 3 is a view of the same utensil shown in Figure 2 with one of the attaching members shown in section.

Figure 4 is an enlarged detail view in longitudinal section of the attaching and driving connections taken on line 4—4 of Figure 1, and Figure 5 is a perspective view of the disassembled parts showing the utensil attaching members.

Figure 1:
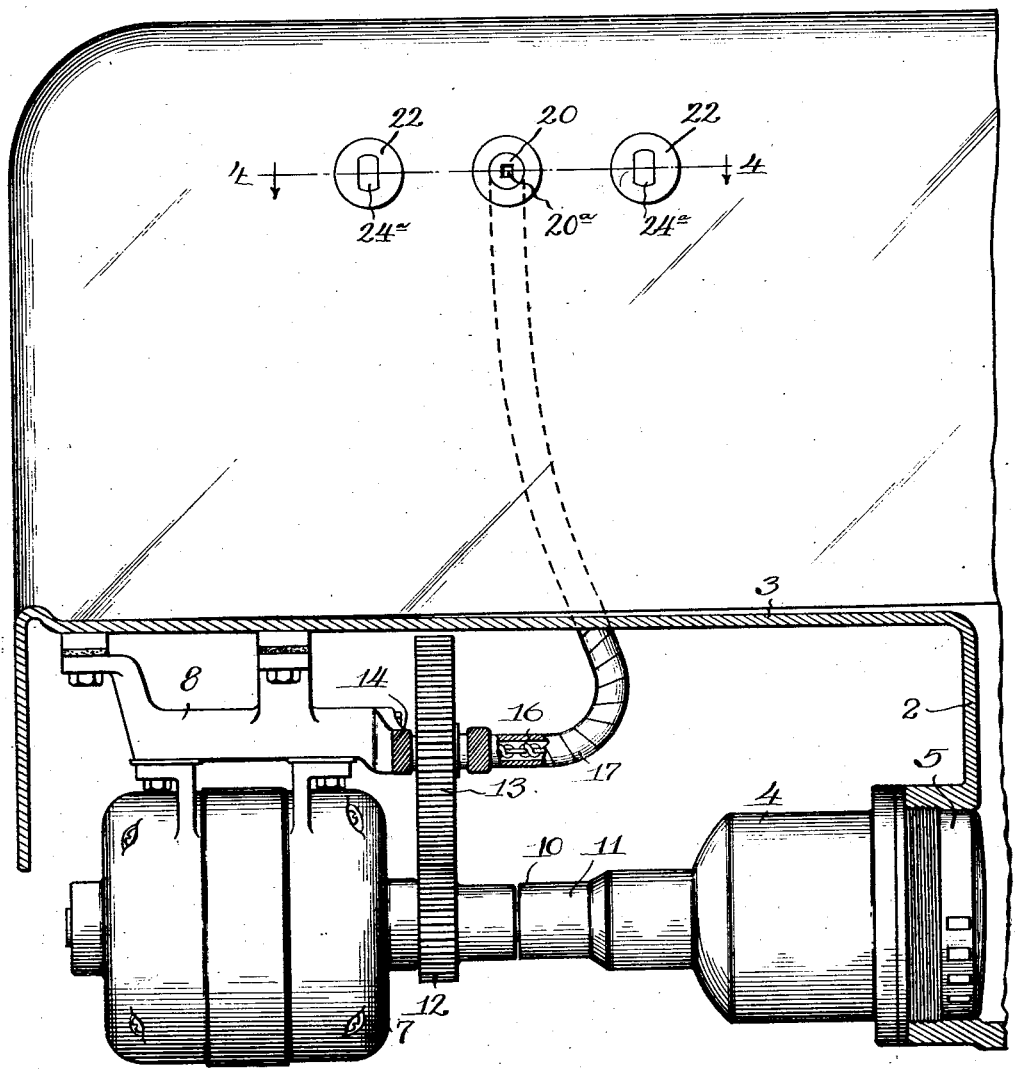

As hereinbefore suggested, the foundation or main supporting member of the devices to be driven is the rear vertical panel 1 of a sink of the standard design and enamelled cast metal construction and comprising in addition a bowl 2, and a drain board 3. The sink is supported against the wall of the kitchen, either upon legs or wall brackets, as preferred.

The sink is equipped with the usual faucet and drain connections and further, with a rotor or rotary water agitating element (not shown) located within a casing 4, having a perforated plate 5 opening into the bowl 2 near its bottom. The mechanical dish washing means forms no part of the present invention, and therefore need not be described in detail other than to point out that it is driven by a motor 7, which is suspended from the under side of the drain board 3, by means of an inverted base 8. The motor armature shaft has direct driving connection with the rotor shaft 10, journalled in a bearing 11, of the rotor casing. Mounted on the rotor shaft 10 is a pinion 12 which meshes with a relatively large reduction gear wheel 13, supported in a journal frame 14, formed integral with the motor base. This gear wheel has direct connection with one end of a flexible shaft 16, enclosed within the usual flexible cable 17.

The flexible shaft and the protecting cable lead upwardly behind the rear panel 1 of the sink, which is spaced away from the wall and provides ample room for the cable. Near the top edge of the panel and above the drain board is provided three openings, the central opening being the outlet from the drive shaft. As shown in 4, a bushing 18 is fitted in the opening flush with the outer face of the panel and extending beyond the rear face. To the rear end of the bushing is threaded a cap 19 into which extends the end of the flexible shaft 16, its surrounding cable 18 being coupled to the cap 19 by a threaded connection. The flexible shaft is connected at its end with a sleeve 20 through a suitable swivel joint, said sleeve being journalled in roller bearings 21 mounted in the bushing 18. The sleeve is formed with a square socket 20ª opening outwardly with its entrance substantially flush with the face of the panel.

The openings on either side of the power opening or outlet just described, provide sockets for attaching the utensils to the panel and in driving connection with the flexible shaft. Each of these sockets comprise a bushing 22, fitting flush in the openings in the panel, with a cylindric cup-like casing 23 threaded onto the rearwardly projecting end. Within the casing 23 is mounted a plunger 24 backed by a coil spring 25. The bushing 22 has an irregular shaped slot 22ª therethrough and which is elongated in a vertical direction with straight sides and curved ends as shown in Figure 5. The plunger 24 has a plug 24ª shaped to conform to the slot, in the bushing, and normally fits therein with its outer face flush with the surface of the panel and finished in the same manner. Thus when a utensil is not in use or has been removed from the panel the plunger comes forward and closes the openings in the attaching sockets so as to seal the cavities and prevent the accumulation of dirt or the entrance of vermin therein.

Having described the means for supporting and supplying power to the utensil to be operated, the co-acting parts of the utensil itself will now be described.

In the drawings a meat grinder 25 has been illustrated as typical of one of a variety of devices that may be attached to the power connection, some of which have already been mentioned. The mechanism of the utensil is therefore, of no importance except that it has a rotative shaft for detachable connection with the flexible shaft. It may be therefore assumed that all the different utensils have the following parts in common with the meat grinder illustrated. Through the rear end of the frame or body projects the end of the shaft 26 or rotary element of the utensil, the same having a square end fitting the socket of the sleeve 20 at the power connection. (Figure 4). From either side of the utensil body extend lateral arms 27, 27 which carry at their ends, locking members 28, 28. Each locking member consisting of a shank 29 turning freely in the arm and having a locking head 30 at its inner end and winged head 31 at its outer end. The locking head is shaped to conform with that of the slots in the attaching sockets and are adapted to enter said slots when the shank is turned to bring the head into registering position with the slot. The shank is of sufficient length to allow the head to clear the slot so that it can be turned through 90° or crosswise of the slot, thereby locking the parts together. Manifestly the plug 24ª which normally closes the slot is forced inwardly with the plunger as the head 30 enters, but again closes the slot when the head is removed. The utensil is further supported by means of a leg 32 extending rearwardly and downwardly from the under side of said utensil having a foot 33 preferably covered by a resilient pad, and adapted to bear against the face panel below the power and attaching connections.

It is contemplated that each of the several utensils will be constructed with a similar arrangement of attaching and rotative parts so that any one can be readily attached and driven in the manner herein described.

Having described a preferred embodiment of the invention, I claim:

1. The combination with a utensil of a supporting panel therefor, a motor driven element journaled in said supporting panel, a socket adjacent said motor driven element, said utensil being provided with a member adapted to engage said motor driven element, and a locking member adapted to be inserted in said socket, and a spring pressed plunger normally closing the opening to said socket.

2. In an apparatus of the character described, the combination of a supporting panel, a motor mounted adjacent said panel, a shaft connected with said motor and terminating in a sleeve journalled in said panel and having an end substantially flush with the surface thereof, a socket in said panel, a spring pressed plunger in said socket normally closing said socket and a driven member having a shaft adapted for detachable driving connection with said sleeve and a locking member operative to engage said socket.

3. In a device of the character described, the combination of a supporting panel and a utensil adapted for detachable mounting thereon, a rotative power driven member journalled in said panel, said utensil being provided with a rotative member having a portion adapted to engage said power driven member, and means for supporting said utensil upon said panel in driving connection with said power driven member comprising a recess in said panel and a spring pressed plug in said recess normally held flush with the surface of said panel and closing the opening to said recess.

4. In an apparatus of the character described, the combination of a supporting panel, a motor driven member journaled in said panel and having a socket opening flush with the surface thereof, and means for attaching an utensil to said panel in driving connection with said driven member, comprising a slotted member flush with the surface of said panel and adapted to be engaged by a locking member on said utensil, and a spring pressed plunger mounted immediately behind said slot and normally closing the same.

5. In an apparatus of the character described, the combination with a supporting panel, a motor driven member journalled in said panel, a socket in said panel adjacent said sleeve and a spring actuated plunger mounted in said socket and normally closing the entrance thereto.

6. The combination with a supporting panel and a utensil adapted to be detachably mounted thereon, of a socket in said panel, a plunger in said socket, a spring acting to yieldably hold said plunger to close the entrance to said socket, and adapted to be depressed upon the insertion of a locking member into said socket for locking connection with said panel.

7. The combination with a supporting panel and a utensil adapted to be detachably mounted thereon, of a motor driven power connection journalled in said panel, and attaching sockets adjacent said power connection adapted to receive locking members of said utensil, and spring pressed plungers mounted in said sockets and normally positioned to close the same.

In witness whereof, I hereunto subscribe my name this 8th day of December, A. D., 1923.

ERICH J. PATELSKI.